United States Patent [19]
Imahashi

[11] Patent Number: 6,043,306

[45] Date of Patent: Mar. 28, 2000

[54] FLAME-RETARDANT THERMOPLASTIC RESIN COMPOSITION

[75] Inventor: Takeshi Imahashi, Sakaide, Japan

[73] Assignee: Kyowa Chemical Industry Co. Ltd., Kagawa, Japan

[21] Appl. No.: 09/084,083

[22] Filed: May 26, 1998

[51] Int. Cl.[7] ....................................................... C08F 6/00

[52] U.S. Cl. ............................................ 524/436; 528/176

[58] Field of Search .............................. 528/176; 524/436

[56] References Cited

U.S. PATENT DOCUMENTS 4,373,048   2/1983   Schubert et al. ......................... 528/176

FOREIGN PATENT DOCUMENTS

| | | |
|---|---|---|
| 0536423 | 4/1993 | European Pat. Off. . |
| 0763563 | 3/1997 | European Pat. Off. . |
| 7119324 | 2/1990 | Japan . |
| 2163167 | 2/1986 | United Kingdom . |

OTHER PUBLICATIONS

Database WPI, Sec. Ch, Week 9017, Derwent Pub. Ltd., London, GB; & JP 02 073838 A (Kurabe KK) Mar. 13, 1990.

*Primary Examiner*—Terressa M. Boykin

[57] ABSTRACT

Provided by the present invention are a flame-retardant thermoplastic resin composition which consists of (a) 100 parts by weight of a thermoplastic resin, (b) 5 to 60 parts by weight of a halogen-containing flame retardant, (c) 3 to 20 parts by weight of a flame-retardant aid, (d) 0.5 to 10 parts by weight of silicone and (e) 5 to 30 parts by weight of magnesium hydroxide particles, and which undergoes extinction without dripping so that highly reliable flame retardancy can be obtained, shows excellent mold releasability, and gives a molded article which hardly suffers deterioration in physical properties; and a molded article molded from the composition.

17 Claims, No Drawings

FLAME-RETARDANT THERMOPLASTIC RESIN COMPOSITION

DETAILED DESCRIPTION OF THE INVENTION

1. Field of the Invention

The present invention relates to a flame-retardant thermoplastic resin composition. More specifically, it relates to a flame-retardant thermoplastic resin composition which undergoes extinction without dripping so that highly reliable flame retardancy can be obtained and which shows excellent mold releasability. The present invention also relates to a flame-retardant thermoplastic resin composition which is improved in the elastic modulus over a base resin and gives a molded article which hardly suffers a decrease in tensile strength and flexural strength.

2. Prior Art

As a method of flame-retarding a thermoplastic resin, there is known a method in which a halogen-containing flame retardant and antimony oxide are used in combination or a method in which metal hydroxide is incorporated.

In the method of using a halogen-containing flame retardant and antimony oxide in combination, V-0 or V-1 in UL94VE method can be attained. However, this method is not sufficiently reliable in the evaluation of flame retardancy since a composition containing these in combination drips. Further, since the composition is poor in releasability from a mold when molded, it is required to spray or apply a mold release agent to a mold. The problem is that the molding operation is therefore rendered complicated or that a molded article is not easily separated from a mold.

On the other hand, the flame-retarding effect of metal hydroxide per unit weight is low, and it is therefore required to incorporate a high concentration of metal hydroxide. When a high concentration of metal hydroxide is incorporated, some resins show a great deterioration in mechanical strength, surface appearance and processability, and the field where the method can be technically applied is limited to a small area. It is therefore still required, not only socially but also technically, to develop a flame-retardant thermoplastic resin composition which contains a halogen-containing flame retardant and which has high strength and high flame retardancy and gives a molded article having an excellent surface appearance.

However, with regard to a flame-retardant thermoplastic resin composition containing a halogen-containing flame retardant, flame retardancy and a method of evaluation of the flame retardancy involve the following question and problem.

A commercially available conventional flame-retardant thermoplastic resin composition, which is flame-retarded by incorporating a halogen-containing flame retardant in order to satisfy V-0 or V-1 in UL94VE test method, drips when tested by the above method, but eventually passes the standard of V-0 or V-1 since it does not cause cotton to fire.

However, the above method has a serious defect in the method of checking the firing of cotton, and the evaluation result of the method is often questionable. That is, when flame of a Bunsen burner is brought into contact with a test piece, the test piece which drips is melted with flaming, and a melt is about to drip into a tube of the Bunsen burner. When the flame of the Bunsen burner is kept in contact while the position of the Bunsen burner is maintained as it is, a melt which is flaming so vigorously as to cause cotton positioned 30 cm below to fire drips into the tube of the Bunsen burner but does not drip on the cotton, and the cotton is not caused to fire in any case.

UL94VE test, therefore, stipulates below. Flame is brought into contact while the Bunsen burner is tilted in a range of up to 45° and the Bunsen burner is readily moved.

However, for bringing flame into contact with a test piece with taking care not to drop a melt into the tube of the Bunsen burner, it is required to remove the Bunsen burner away from the test piece about 0.2 to several seconds before the melt starts to drip.

In the above short period of time, the flame of the flaming melt decreases in size or is extinguished. That is, in the above method, a melt which is brought into a state of not easily causing cotton to fire drips on cotton, and the cotton is not fired in some cases. Even if it is certified that some compositions have passed the standard of V-0 or V-1 according to UL94VE, the results are questionable to many people.

Further, there is another problem below. When a test piece drips at a time of first flame contact, the lower portion of the test piece sags in the form of a yarn, and it is impossible to bring flame into contact with the test piece perpendicularly from below the test piece. In UL94VE, the portion in the form of a yarn is disregarded for bringing flame into contact.

The portion in the form of a yarn after the first flame contact is cut off in a place about 12 cm from the top portion of the test piece with scissors while the test piece is suspended, and flame is brought into contact with the remaining test piece perpendicularly below the test piece in a second flame contact. When the test according to UL94VE method is modified as above, and when a test piece which has passed V-0 or V-1 is tested according to the above-modified UL94VE method, cotton catches fire with a drip which takes place in the second flame contact, and in this case, many test pieces result in V-2.

There is further another problem. In the UL94VE method, the distance from cotton to a flame contact portion of a test piece is set at 30 cm. However, when the above distance is set at 15 cm or smaller, most of products of flame-retardant thermoplastic resins which a have passed V-0 or V-1 cause cotton to fire and result in a decreased rating of V-2.

As explained above, flame-retardant thermoplastic resins which have passed V-0 or V-1 of the UL94VE method are not always sufficiently reliable concerning flame retardancy if they drip. It has been therefore desired to develop a flame-retardant thermoplastic resin composition which is extinguished without dripping and is highly reliable concerning the certification of flame retardancy.

JP-7-119324-B discloses a flame-retardant olefin polymer resin composition which contains 100 parts by weight of a total of a polyolefin resin and an olefin polymer modified with an unsaturated carboxylic acid or its derivative, 5 to 200 parts by weight of a flame retardant and 0.05 to 200 parts by weight of a notched whitening preventer and is improved in notched whitening.

Examples disclosed in the above Japanese Patent Publication mainly show resin compositions containing 96 parts by weight of an EVA resin (ethylene-vinyl-acetate copolymer resin) or an EEA resin (ethylene-ethyl-acrylate copolymer resin) and 6 parts by weight of a maleic-acid-modified ethylene-butene copolymer as a total of 100 parts by weight and containing 120 parts by weight of magnesium hydroxide or aluminum hydroxide as a flame retardant and 0.5 to 6.0 part by weight of silicone as a notched whitening preventer. However, the above Japanese Patent Publication discloses nothing concerning the use of a halogen-containing flame retardant, a flame-retardant aid such as antimony oxide, magnesium hydroxide and silicone in combination.

Further, the above Japanese Patent Publication describes that an inorganic flame retardant such as magnesium hydroxide is used in an amount of 30 to 200 parts by weight per 100 parts by weight of the resin component. Further, flame retardancy is simply referred to by showing values of oxygen index in Examples, and as far as dripping is concerned, nothing is described.

Problems to be Solved by the Invention

The present invention seeks to overcome the problem of a prior art composition, i.e., a flame-retardant thermoplastic resin composition which is flame-retarded by incorporating a halogen-containing flame retardant and a flame-retardant aid in combination.

That is, it is an object of the present invention to provide a flame-retardant thermoplastic resin composition which is extinguished without dripping so as to have high reliability concerning flame retardancy, which has excellent releasability from a mold when molded, which is improved in elastic modulus as compared with a base resin and which hardly suffers a decrease in tensile strength and flexural strength.

Means to Solve the Problems

The present inventor has found the following and has arrived at the present invention. By combining (a) a thermoplastic resin, (b) a halogen-containing flame retardant, (c) a flame-retardant aid, (d) silicone and (e) magnesium hydroxide particles in a specific mixing ratio, there can be provided a flame-retardant thermoplastic resin composition which is extinguished without dripping so as to have high reliability concerning flame retardancy, which has excellent releasability from a mold when molded, which is improved in elastic modulus as compared with a base resin and which hardly suffers a decrease in tensile strength and flexural strength.

That is, according to the present invention, there is provided a flame-retardant thermoplastic resin composition consisting essentially of (a) 100 parts by weight of a thermoplastic resin, (b) 5 to 60 parts by weight of a halogen-containing flame retardant, (c) 3 to 20 parts by weight of a flame-retardant aid, (d) 0.5 to 10 parts by weight of silicone and (e) 5 to 30 parts by weight of magnesium hydroxide particles.

A composition consisting a combination of the components (a), (b) and (c) alone according to a prior art has problems that it drips in the test of flame retardancy and that a molded article therefrom is poor in releasability from a mold.

Concerning a composition consisting a combination of the components (a), (b), (c) and (d), it is required to add a large amount of the component (d) which is expensive, for preventing the dripping. Further, the addition of a large amount of silicone not only decreases elastic modulus, tensile strength and flexural strength but also increases a flaming time in the test of flame retardancy, which reversely deteriorates the flame retardancy.

A composition consisting the components (a), (b), (c) and (e) has a problem that it shows poorer flame retardancy than a composition containing a combination of the components (a), (b) and (c) and that it shows only a small effect on the prevention of dripping.

For providing a flame-retardant thermoplastic resin composition which is extinguished without dripping, has excellent releasability from a mold, has improved elastic modulus as compared with a base resin, hardly suffers a decrease in tensile strength and flexural strength and has excellent economic performance, it is required to combine all of the above components (a), (b), (c), (d) and (e) in a specific mixing ratio.

The thermoplastic resin (a) used in the present invention includes (i) polyolefin resins such as polypropylene, a copolymer from propylene and other α-olefin, polyethylene, a copolymer from ethylene and other α-olefin, an EVA (ethylene-vinyl acetate copolymer) resin, an EEA (ethylene-ethyl acrylate copolymer) resin, an EMA (ethylene-methyl acrylate copolymer) resin and a TPO resin (polyolefin-containing thermoplastic elastomer); (ii) styrene-containing resins such as polystyrene, an ABS (acrylonitrile-butadiene-styrene copolymer) resin and an AS (acrylonitrile-styrene copolymer) resin; (iii) polyamide resins such as nylon-6 and nylon-66; (iv) polyacetal; (v) polyester resins such as a PET (polyethylene terephthalate) resin and a PBT (polybutylene terephthalate) resin; and other resins such as polyurethane, an acrylic resin, polyimide, polyamideimide, polyvinyl chloride, chlorinated polyethylene, polycarbonate, polyvinyl alcohol, polyvinylidene chloride, polyvinyl butyral, polyvinyl formal, polyvinyl acetate, chlorinated polyether, cellulose, a phenoxy resin and a fluorine resin. However, the thermoplastic resin (a) shall not be limited to the above resins. Of these, styrene-containing resins such as polystyrene and an ABS resin, polyolefin resins such as polypropylene and polyethylene and polyamide resins such as nylon-6 are preferred. Of the above thermoplastic resins, the polyolefin resin can be produced by any method without any special limitation. The catalyst for use therefor can be selected from a Ziegler catalyst, a Ziegler-Natta catalyst, a metallocene catalyst, a Friedel-Crafts catalyst or a Phillips catalyst.

The halogen-containing flame-retardant (b) used in the present invention includes ethylenebispentabromodiphenyl, tetrabromobisphenol A-bis(2,3-dibromopropyl ether), decabromodiphenyl oxide, octabromodiphenyl oxide, pentabromodiphenyl oxide, tetrabromobisphenol A, tetrabormobisphenol A-bis(2-hydroxy ether), tetrabromobisphenol A-bis(allyl ether), hexabromocyclodecane, bis(tribromophenoxy)ethane, tetrabromobisphenol A epoxy oligomer, tetrabromobisphenol A carbonate oligomer, ethylenebistetrabromophthalimide, poly-dibromophenylene oxide, 2,4,6-tribromophenol, tetrabromobisphenol A-bis(acrylate), tetrabromophthalic anhydride, tetrabromophthalatediol, 2,3-dibromopropanol, tribromostyrene, tetrabromophenylmaleimide, poly(pentabromobenzyl) acrylate, tris(tribromoneopenyl) phosphate, tris(dibromophenyl)phosphate, tris(tribromophenyl)phosphate, chlorinated paraffin, perchlorocyclopentadecane, tetrachlorophthalic anhydride, chlorendic acid, dodecachlorocyclooctane, tetrabromobenzene, tetrabromoethane, tetrabromobutane, hexabromocyclodecane, pentabromotoluene, hexabromobiphenyl, tribromophenol and tetrabromophthalic anhydride. Of the above halogen-containing flame-retardants (b), preferred are those having a bromine content of at least 40% by weight, preferably at least 50% by weight. Further, of the above halogen-containing flame-retardants, preferred are those having a decomposition initiation temperature of about 230° C. or higher.

The amount of the halogen-containing flame-retardant (b) per 100 parts by weight of the thermoplastic resin (a) is preferably 5 to 60 parts by weight, more preferably 10 to 50 parts by weight. When the above amount is less than 5 parts by weight, it is difficult to impart the thermoplastic resin with flame retardancy. When it exceeds 60 parts by weight, the resultant composition may be poor in mechanical strength, and such a large amount is also disadvantageous for economic performance.

The flame-retardant aid used in the present invention can be selected from those which are generally used as a flame retardant aid together with a halogen-containing flame retardant or magnesium hydroxide. The flame-retardant aid includes antimony trioxide, antimony pentoxide, antimony tetraoxide, hexaanthimony tridecaoxide, crystalline antimonic acid, lithium antimonate, barium antimonate, zinc borate, zinc stannate, basic zinc molybdate, zinc calcium molybdate, zirconium oxide, zinc oxide, iron oxide, red phosphorus and carbon black. Of these, antimony trioxide, antimony pentoxide, zinc stannate or zinc borate is preferred.

The amount of the flame-retardant aid (c) per 100 parts by weight of the thermoplastic resin (a) is preferably 3 to 20 parts by weight, more preferably 5 to 18 parts by weight. When the above amount is smaller than 3 parts by weight, the effect on flame retardancy is insufficient. When it exceeds 20 parts by weight, the flame retardancy is not improved any further, and such a large amount is disadvantageous for economic performance.

The silicone (d) used in the present invention includes a silicone resin, a silicone grease, a silicone rubber and a silicone oil. The amount of the silicone (d) per 100 parts by weight of the thermoplastic resin (a) is preferably 0.5 to 10 parts by weight, more preferably 1 to 5 parts by weight. When the above amount is smaller than 0.5 part by weight, the effect on preventing the dripping of the thermoplastic resin (a) is not sufficient. As a silicone (d), preferred is a silicone resin or a silicone grease.

In the present invention, it is considered that the effect on the prevention of dripping is a synergistic effect produced by magnesium hydroxide particles (e) and the silicone (d). It is therefore disadvantageous for economic performance to add more than 10 parts by weight of an expensive silicone. Further, when the amount of the silicone (d) exceeds 10 parts by weight, the elastic modulus, the tensile strength and the flexural strength may decrease, and the resultant composition may be poor in mechanical strength. Further, in a test according to UL94VE method, a flaming time increases, and some compositions may fail to pass the standard of V-0, V-1 or V-2.

The magnesium hydroxide particles (e) used in the present invention may be any one of a synthetic product or a natural product so long as they are in the form of powder. For maintaining the moldability of the thermoplastic resin and the mechanical strength and the surface appearance of a molded article at an excellent level, however, the specific surface area of the magnesium hydroxide particles (e) measured by a BET method is 1 to 20 m$^2$/g, preferably 2 to 10 m$^2$/g, and the average secondary particle diameter thereof measured by a microtrack method is 0.2 to 6 $\mu$m, preferably 0.3 to 5 $\mu$m. The amount of the magnesium hydroxide particles (e) per 100 parts by weight of the thermoplastic resin (a) is preferably 5 to 30 parts by weight, more preferably 8 to 20 parts by weight.

When the above amount of the magnesium hydroxide particles (e) is less than 5 parts by weight, the effect on preventing the dripping of the thermoplastic resin (a) is insufficient. The effect on preventing the dripping in the present invention is a synergistic effect produced by a combination of the silicone (d) and the magnesium hydroxide (e) as described above, and it is therefore unnecessary to incorporate more than 30 parts by weight of the magnesium hydroxide particles (e). Further, when incorporated in an amount of greater than 30 parts by weight, undesirably, the magnesium hydroxide particles (e) promote the fragility of the thermoplastic resin and decrease the toughness thereof.

As magnesium hydroxide particles (e), there may be used magnesium hydroxide particles which are surface-treated or are not surface-treated, though it is preferred to use surface-treated magnesium hydroxide particles.

The magnesium hydroxide particles (e) may be preferably surface-treated with any one selected from the following surface treating agents; (i) higher fatty acids having at least 10 carbon atoms such as stearic acid, oleic acid, erucic acid and palmitic acid and alkali metal salts thereof; (ii) silane coupling agents such as vinylethoxysilane, vinyl-tris(2-methoxy)silane, γ-methacryloxypropyltrimethoxysilane, γ-aminopropyltrimethoxysilane, β-(3,4-epoxycyclohexyl) ethyltrimethoxysilane, γ-glycidoxypropyltrimethoxysilane and γ-mercaptopropyltrimethoxysilane; (iii) titanate-containing coupling agents such as isopropyltriisostearoyl titanate, isopropyltris(dioctylpyrophosphate), isopropyltri (N-aminoethyl-aminoethyl)titanate and isopropyltridecyl-bezenesulfonyl titanate; (iv) aluminum-containing coupling agents such as acetoalkoxyaluminum diisopropylate; (v) phosphate esters such as mono- or diester of orthophosphoric acid and stearyl alcohol, a mixture of these esters or alkali metal salt of these esters or amine salt of these esters, and (vi) anionic surfactants such as amide-bonding aliphatic carboxylate, amide-bonding sulfate, amide-bonding sulfonate, amide-bonding alkylallylsulfonate, sulfate of a higher alcohol such as stearyl alcohol, sulfate of polyethylene glycol ether, ester-bonding sulfate, ester-bonding sulfonate, ester-bonding alkylallylsulfonate and ether-bonding alkylallylsulfonate.

The flame-retardant thermoplastic resin composition of the present invention contains the above thermoplastic resin (a), halogen-containing flame retardant (b), flame-retardant aid (c), silicone (d) and magnesium hydroxide (e) in the above-specified mixing ratio, and the method of mixing these components is not specially limited. That is, any mixing means can be employed so long as the above components can be homogeneously mixed. For example, there can be employed a method in which the above components and other additive are mixed to prepare a preliminary mixture and the preliminary mixture is melt-kneaded with an open roll, a single- or twin-screw extruder or a Banbury mixer. The method of molding the so-obtained resin composition is not specially limited, either. For example, there can be employed a molding method such as an injection molding method, an extrusion method, a blow molding method, a press forming method, a rotary molding method, calendering method or a sheet forming method.

The flame-retardant thermoplastic resin composition of the present invention may further contain a polymer alloy compatibilizer for improving a molded article in tensile strength and/or impact strength. The amount of the polymer alloy compatibilizer per 100 parts by weight of the thermoplastic resin (a) is 1 to 30 parts by weight, preferably 3 to 20 parts by weight. For example, the polymer alloy compatibilizer includes a maleic-anhydride-modified styrene-ethylene-butylene resin, a maleic-anhydride-modified styrene-ethylene-butene resin, maleic-anhydride-modified polyethylene, maleic-anhydride-modified EPR, maleic-anhydride-modified polypropylene, a maleic-anhydride-modified olefin oligomer, carboxyl-modified polyethylene, epoxy-modified polystyrene-PMMA resin, a polystyrene-polyimide block copolymer, a polystyrene-methyl methacrylate block copolymer, a polystyrene-polyethylene block copolymer, a polystyrene-ethyl acrylate graft copolymer, a polystyrene-polybutadiene graft copolymer, a polypropylene-ethylene-propylene-diethylene copolymer, a polypropylene-polyamide graft copolymer and an ethyl polyacrylate-polyamide graft copolymer.

Further, the flame-retardant thermoplastic resin composition of the present invention may further contain other additive, reinforcing agent, filler and the like, which are generally used for resins. The total amount of these per 100 parts by weight of the thermoplastic resin (a) is 10 parts by weight or less. Examples of the above additive, etc., include an antioxidant, an ultraviolet absorbent, a light stabilizer, a heat stabilizer, a metal deactivating agent, a crosslinking agent, a colorant, a curing agent, a nucleating agent, a foaming agent, a deodorant, lithopone, clay, wood flour, a glass fiber, ferrite, talc, mica, wollatonite, calcium carbonate, fibrous magnesium hydroxide, fibrous basic magnesium sulfate, a metal fiber, calcium silicate, diatomaceous earth, siliceous sand, alumina, powdered glass, graphite, black lead, silicon carbide, silicon nitride, boron nitride, aluminum nitride, Shirasu (volcano-genic ash) balloon, metal balloon, glass balloon, pumice, a carbon fiber, a graphite fiber, a silicon carbide fiber and asbestos.

EXAMPLES

The present invention will be explained in more detail with reference to Examples hereinafter.

Methods of measurements of BET specific surface area, average secondary particle diameter, flame retardancy, flexural strength, flexural modulus and tensile yield strength in Examples will be explained below.

(1) BET specific surface area

Measured with a 12-specimen fully automatic surface measuring apparatus, Multi-sorb-12, manufactured by Yuasa Ionix K.K.

(2) Average secondary particle diameter

Measured with a microtrack of Leed & Nortrup Instruments Company.

(3) Mold releasability

A No. 1 test piece according to JIS K7113 tensile test, obtained by injection molding, was evaluated for releasability from a mold. Evaluation results were rated as "good" (the test piece was easily releasable without spraying any mold release agent) or "poor" (the test piece was not easily releasable without spraying a mold release agent).

(4) Flexural strength, flexural modulus Measured according to JIS K7203.

Conditioning adjustment was carried out at 23° C.±2° C. and 50% RH.

(5) Tensile yield strength

Measured according to JIS K7113.

Conditioning adjustment was carried out at 23° C.±2° C. and 50% RH.

(6) Flame retardancy

Measured according to the following two methods.

(6)-1 UL94VE method (6)-2 Kyowa Chemical Method (Modified UL94VE method)

The distance from the bottom end of a test piece to cotton in UL94VE method was 30 cm. Flame retardancy was evaluated when the above distance (30 cm) was maintained as it was and when the above distance was changed to 5 cm. The evaluation was carried out as follows.

Flame was brought into contact with a test piece for the first time. When the test piece did not drip in the first contact of flame, flame was brought into contact with the test piece for the second time with the test piece suspended as it was.

When the test piece dripped in the first contact of flame, the test piece was cut in a place 12 cm away from the top end of the test piece to remove its lower portion, and flame was brought into contact with the remaining test piece right underneath the test piece. When the test piece was about to drip so as to fall a melt into a tube of a Bunsen burner, the Bunsen burner was moved according to UL94VE method. UL94VE method was followed for the rest of procedure.

In ratings of evaluation results, results corresponding to V-0 in UL94VE method were rated as K-0, V-1 as K-1, and V-2 as K-2. Further, evaluation results were rated in more detail as below depending upon whether or not test pieces dripped. Test results of UL94VE method were also rated as below. Test results that test pieces were extinguished without dripping were rated as V-0, V-1, K-0 and K-1, and test results that test pieces dripped and were extinguished without causing the firing of cotton were rated by adding * such as V-0*, V-1*, K-0* and K-1*.

Test results that test pieces dripped, were extinguished and caused the firing of cotton were rated as V-2 and K-2. Test results which did not came under any of the above ratings were expressed as "out of standard".

Example 1 and Comparative Examples 1 to 5

Components shown in Table 1 were mixed in their respective mixing ratios shown in Table 1 in advance, and the mixture was melt-kneaded with a twin-screw extruder at 200° C. to obtain pellets. The pellets were dried with a vacuum dryer at 60° C. for 16 hours and then injection-molded to obtain test pieces for the above tests.

As polystyrene (a) in Example 1 and in Comparative Examples 1 to 5, a high-impact polystyrene was used.

As halogen-containing flame retardant (b) in all of Example 1 and in Comparative Examples 1 to 4, ethylenebis-pentabromodiphenyl was used.

As a flame-retardant aid (c) in Example 1 and in Comparative Examples 1 to 4, antimony trioxide (Atox B) supplied by Nihon Seiko K.K. was used.

As silicone (d) in Example 1 and in Comparative Examples 2 and 3, silicone resin powder (DC4-7081) supplied by Toray-Dow Corning K.K. was used.

Synthetic magnesium hydroxide particles having a BET specific surface area of 6.0 $m^2/g$ and an average secondary particle diameter, measured by a microtrack method, of 0.8 µm were surface-treated with 3 parts by weight, per 100 parts by weight of the magnesium hydroxide particles, of sodium stearate, and the thus-surface-treated magnesium hydroxide particles were used as magnesium hydroxide particles (e) in Example 1 and Comparative Example 4.

Table 2 shows test results of flame retardancy, mold releasability and mechanical strength.

TABLE 1

| | Polystyrene (a) | Flame retardant (b) (Ethylenebispenta-bromodiphenyl) | Flame-retardant aid (c) (Antimonytrioxide) | Silicone (d) | Magnesium hydroxide particles (e) |
|---|---|---|---|---|---|
| Ex. 1 | 100 | 16 | 6 | 1 | 15 |
| Comp. Ex. 1 | 100 | 16 | 6 | 0 | 0 |
| Comp. Ex. 2 | 100 | 16 | 6 | 1 | 0 |
| Comp. Ex. 3 | 100 | 16 | 6 | 15 | 0 |
| Comp. Ex. 4 | 100 | 16 | 6 | 0 | 15 |
| Comp. Ex. 5 | 100 | 0 | 0 | 0 | 0 |

Ex.: Example, Comp. Ex.: Comparative Example

TABLE 2

Flame Retardancy Test

| | UL94VE 1/16 inch | Flame Retardant Test, in accordance with Kyowa Chemical Method | |
|---|---|---|---|
| | | Test in dripping distance of 30 cm, 1/16 inch | Test in dripping distance of 5 cm, 1/16 inch |
| Ex. 1 | V-0 | K-0 | K-0 |
| Comp. Ex. 1 | V-0* | K-2 | K-2 |
| Comp. Ex. 2 | V-0* | K-2 | K-2 |
| Comp. Ex. 3 | out of standard | out of standard | out of standard |
| Comp. Ex. 4 | V-0* | K-2 | K-2 |
| Comp. Ex. 5 | out of standard | out of standard | out of standard |

| | Mold releasability | Flexural strength (kgf/mm²) | Flexural modulus (kgf/mm²) | Tensile yield strength (kgf/mm²) |
|---|---|---|---|---|
| Ex. 1 | Good | 5.75 | 314 | 3.30 |
| Comp. Ex. 1 | Poor | 5.72 | 256 | 3.42 |
| Comp. Ex. 2 | Good | 5.78 | 252 | 3.35 |
| Comp. Ex. 3 | Good | 4.39 | 187 | 2.65 |
| Comp. Ex. 4 | Poor | 5.77 | 319 | 3.33 |
| Comp. Ex. 5 | Poor | 5.98 | 233 | 3.61 |

Ex.: Example, Comp. Ex.: Comparative Example

Examples 2 and 3 and Comparative Examples 6 and 7

Components shown in Table 3 were mixed in their respective mixing ratios shown in Table 3 in advance, and the mixture was melt-kneaded with a twin-screw extruder at 230° C. to obtain pellets.

The pellets were dried with a hot air dryer at 120° C. for 2 hours and then injection-molded to obtain test pieces for the above tests.

As polypropylene (a) in Examples 2 and 3 and Comparative Examples 6 and 7, an injection-grade polypropylene was used.

As a halogen-containing flame retardant (b) in Examples 2 and 3 and Comparative Example 6, ethylenebispentabromodiphenyl was used.

As a flame-retardant aid (c) in Examples 2 and 3 and Comparative Example 6, antimony trioxide (Atox B) supplied by Nihon Seiko K.K. was used.

As a silicone (d) in Examples 2 and 3, silicone resin powder (DC4-7081) supplied by Toray-Dow Corning K.K. was used.

As magnesium hydroxide particles (e) in Example 2, synthetic magnesium hydroxide particles having a BET specific surface area of 15.2 m²/g and an average secondary particle diameter, measured by a microtrack method, of 0.4 μm were surface-treated with 3.0 parts by weight, per 100 parts by weight of the magnesium hydroxide particles, of isopropyl-triisostearoyl-titanate, and the thus-surface treated magnesium hydroxide particles were used.

As magnesium hydroxide particles (e) in Example 3, 100 parts by weight of natural magnesium hydroxide particles having a BET specific surface area of 3.2 m²/g and an average secondary particle diameter, measured by a microtrack method, of 5.1 μm were surface-treated with 2% of distearyl alcohol phosphate ester diethanolamine salt, and the thus-surface-treated magnesium hydroxide particles were used.

Table 4 shows test results of flame retardancy, mold releasability and mechanical strength.

TABLE 3

| | Poly-propylene (a) | Flame retardant (b) (Ethylenebispenta-bromodiphenyl) | Flame-retardant aid (c) (Antimonytrioxide) | Silicone (d) | Magnesium hydroxide particles (e) |
|---|---|---|---|---|---|
| Ex. 2 | 100 | 39 | 13 | 1 | 10 |
| Ex. 3 | 100 | 39 | 13 | 5 | 10 |
| Comp. Ex. 6 | 100 | 39 | 13 | 0 | 0 |
| Comp. Ex. 7 | 100 | 0 | 0 | 0 | 0 |

Ex.: Example, Comp. Ex.: Comparative Example

TABLE 4

Flame Retardancy Test

| | Flame Retardant Test, in accordance with Kyowa Chemical Method | | |
|---|---|---|---|
| | UL94VE 1/16 inch | Test in dripping distance of 30 cm, 1/16 inch | Test in dripping distance of 5 cm, 1/16 inch |
| Ex. 2 | V-0 | K-0 | K-0 |
| Ex. 3 | V-0 | K-0 | K-0 |

TABLE 4-continued

| | | | |
|---|---|---|---|
| Comp. Ex. 6 | V-1* | K-2 | K-2 |
| Comp. Ex. 7 | out of standard | out of standard | out of standard |

| | Mold releasability | Flexural strength (kgf/mm$^2$) | Flexural modulus (kgf/mm$^2$) | Tensile yield strength (kgf/mm$^2$) |
|---|---|---|---|---|
| Ex. 2 | Good | 3.75 | 198 | 2.36 |
| Ex. 3 | Good | 3.51 | 157 | 2.22 |
| Comp. Ex. 6 | Poor | 3.79 | 163 | 2.38 |
| Comp. Ex. 7 | Good | 3.92 | 150 | 2.88 |

Ex.: Example, Comp. Ex.: Comparative Example

Example 4 and Comparative Examples 8 and 9

Components shown in Table 5 were mixed in their respective mixing ratios shown in Table 5 in advance, and the mixture was melt-kneaded with a single-screw extruder at 220° C. to obtain pellets.

The pellets were dried with a vacuum dryer at 60° C. for 16 hours and then injection-molded to obtain test pieces for the above tests.

As an ABS resin (a) in Example 4 and Comparative Examples 8 and 9, a high-impact ABS resin was used.

As a halogen-containing flame retardant (b) in Example 4 and Comparative Example 8, decabromodiphenyl oxide was used.

As a flame-retardant aid (c) in Example 4 and Comparative Example 8, antimony trioxide (Atox S) supplied by Nihon Seiko K.K. was used.

As a silicone (d) in Example 4, a silicon grease (XR39-A6808) supplied by Toshiba Silicone was used.

As magnesium hydroxide particles (e) in Example 4, synthetic magnesium hydroxide particles having a BET specific surface area of 5.6 m$^2$/g and an average secondary particle diameter, measured by a microtrack method, of 0.8 μm were surface-treated with 0.5 part by weight, per 100 parts by weight of the magnesium hydroxide particles, of sodium oleate and then further surface-treated with 1.5 parts by weight, per 100 parts by weight of the magnesium hydroxide particles, of γ-glycidoxypropyltriethoxysilane, and the thus-surface-treated magnesium hydroxide particles were used.

Table 6 shows test results of flame retardancy, mold releasability and mechanical strength.

TABLE 5

| | ABS resin (a) | Flame retardant (b) (Decabromodiphenyl oxide) | Flame-retardant aid (c) (Antimonytrioxide) | Silicone (d) | Magnesium hydroxide particles (e) |
|---|---|---|---|---|---|
| Ex. 4 | 100 | 16 | 6 | 2 | 10 |
| Comp. Ex. 8 | 100 | 16 | 6 | 0 | 0 |
| Comp. Ex. 9 | 100 | 0 | 0 | 0 | 0 |

Ex.: Example, Comp. Ex.: Comparative Example

TABLE 6

Flame Retardancy Test

| | Flame Retardancy Test, in accordance with Kyowa Chemical Method | | |
|---|---|---|---|
| | UL94VE 1/12 inch | Test in dripping distance of 30 cm, 1/12 inch | Test in dripping distance of 5 cm, 1/12 inch |
| Ex. 4 | V-1 | K-1 | K-1 |
| Comp. Ex. 8 | out of standard | out of standard | out of standard |
| Comp. Ex. 9 | out of standard | out of standard | out of standard |

| | Mold releasability | Flexural strength (kgf/mm$^2$) | Flexural modulus (kgf/mm$^2$) | Tensile yield strength (kgf/mm$^2$) |
|---|---|---|---|---|
| Ex. 4 | Good | 6.72 | 330 | 4.01 |
| Comp. Ex. 8 | Poor | 6.79 | 268 | 4.12 |
| Comp. Ex. 9 | Poor | 7.23 | 245 | 4.32 |

Ex.: Example, Comp. Ex.: Comparative Example

Example 5 and Comparative Examples 10 and 11

Components shown in Table 7 were mixed in their respective mixing ratios shown in Table 7 in advance, and the mixture was melt-kneaded with a single-screw extruder at 220° C. to obtain pellets.

The pellets were dried with a vacuum dryer at 60° C. for 16 hours and then injection-molded to obtain test pieces for the above tests.

As a high-density polyethylene (a) in Example 5 and Comparative Examples 10 and 11, an injection-grade high-density polyethylene was used.

As a halogen-containing flame retardant (b) in Example 5 and Comparative Example 10, tetrabromobisphenol A bis (allyl ether) was used.

As a flame-retardant aid (c) in Example 5 and Comparative Example 10, antimony trioxide (Atox B) supplied by Nihon Seiko K.K. was used.

As a silicone (d) in Example 5, silicon resin powder (DC4-7081) supplied by Toray-Dowcorning-Silicone K.K. was used.

As magnesium hydroxide particles (e) in Example 5, synthetic magnesium hydroxide particles having a BET specific surface area of 4.8 m²/g and an average secondary particle diameter, measured by a microtrack method, of 0.9 μm were surface-treated with 2 parts by weight, per 100 parts by weight of the magnesium hydroxide particles, of sodium erucate, and the thus-surface-treated magnesium hydroxide particles were used.

Table 8 shows test results of flame retardancy, mold releasability and mechanical strength.

TABLE 7

|  | High-density polyethylene (a) | Flame retardant (b) (Tetrabromobisphenol A bis(allyl ether)) | Flame-retardant aid (c) (Antimonytrioxide) | Silicone (d) | Magnesium hydroxide particles (e) |
| --- | --- | --- | --- | --- | --- |
| Ex. 5 | 100 | 48 | 16 | 2 | 10 |
| Comp. Ex. 10 | 100 | 48 | 16 | 0 | 0 |
| Comp. Ex. 11 | 100 | 0 | 0 | 0 | 0 |

Ex.: Example, Comp. Ex.: Comparative Example

TABLE 8

| | Flame Retardancy Test | | |
| --- | --- | --- | --- |
| | | Flame Retardancy Test, in accordance with Kyowa Chemical Method | |
| | UL94VE 1/16 inch | Test in dripping distance of 30 cm, 1/16 inch | Test in dripping distance of 5 cm, 1/16 inch |
| Ex. 5 | V-0 | K-0 | K-0 |
| Comp. Ex. 10 | V-0* | K-2 | K-2 |
| Comp. Ex. 11 | out of standard | out of standard | out of standard |

| | Mold releasability | Flexural strength (kgf/mm²) | Flexural modulus (kgf/mm²) | Tensile yield strength (kgf/mm²) |
| --- | --- | --- | --- | --- |
| Ex. 5 | Good | 2.28 | 165 | 2.36 |
| Comp. Ex. 10 | Poor | 2.31 | 134 | 2.42 |
| Comp. Ex. 11 | Good | 2.56 | 120 | 2.95 |

Ex.: Example, Comp. Ex.: Comparative Example

Example 6 and Comparative Examples 12 and 13

Components shown in Table 9 were mixed in their respective mixing ratios shown in Table 9 in advance, and the mixture was melt-kneaded with a twin-screw extruder at 280° C. to obtain pellets.

The pellets were dried with a vacuum dryer at 120° C. for 5 hours and then injection-molded to obtain test pieces for the above tests.

As nylon-6 (a) in all of Example 6 and Comparative Examples 12 and 13, an injection-grade nylon-6 was used.

As a halogen-containing flame retardant (b) in Example 6 and Comparative Example 12, perchloropentacyclodecane was used.

As a flame-retardant aid (c) in Example 6 and Comparative Example 12, antimony trioxide (Atox S) supplied by Nihon Seiko K.K. and zinc stannate having an average particle diameter of 2.5 μm were used.

As a silicone (d) in Example 6, silicon resin powder (DC4-7081) supplied by Toray-Dowcorning-Silicone K.K. was used.

As magnesium hydroxide particles (e) in Example 6, synthetic magnesium hydroxide particles having a BET specific surface area of 4.3 m²/g and an average secondary particle diameter, measured by a microtrack method, of 1.0 μm were surface-treated with 0.5 part by weight, per 100 parts by weight of the magnesium hydroxide particles, of sodium salt of oleoyl sarcosine, and the thus-surface-treated magnesium hydroxide particles were used.

Table 10 shows test results of flame retardancy, mold releasability and mechanical strength.

TABLE 9

|  | Nylon-6 (a) | Flame retardant (b) (perchloro-pentacyclodecane) | Flame-retardant aid (c) (C-1): Zinc stannate (C-2): Antimony trioxide | Silicone (d) | Magnesium hydroxide particles (e) |
| --- | --- | --- | --- | --- | --- |
| Ex. 6 | 100 | 18 | C-1: C-2; 2 | 2 | 10 |
| Comp. Ex. 12 | 100 | 18 | C-1; 6, C-2; 2 | 0 | 0 |
| Comp. Ex. 13 | 100 | 0 | 0 | 0 | 0 |

Ex.: Example, Comp. Ex.: Comparative Example

TABLE 10

| | Flame Retardancy Test | | |
| --- | --- | --- | --- |
| | | Flame Retardant Test, in accordance with Kyowa Chemical Method | |
| | UL94VE 1/16 inch | Test in dripping distance of 30 cm, 1/16 inch | Test in dripping distance of 5 cm, 1/16 inch |
| Ex. 6 | V-0 | K-0 | K-0 |
| Comp. Ex. 12 | V-0* | K-2 | K-2 |
| Comp. Ex. 13 | out of standard | out of standard | out of standard |

TABLE 10-continued

| | Mold releasability | Flexural strength (kgf/mm$^2$) | Flexural modulus (kgf/mm$^2$) | Tensile yield strength (kgf/mm$^2$) |
| --- | --- | --- | --- | --- |
| Ex. 6 | Good | 6.12 | 172 | 4.32 |
| Comp. Ex. 12 | Poor | 6.15 | 140 | 4.38 |
| Comp. Ex. 13 | Poor | 6.51 | 120 | 5.12 |

Ex.: Example, Comp. Ex.: Comparative Example

Examples 7 and Comparative Example 14

Components shown in Table 11 were mixed in their respective mixing ratios shown in Table 11 in advance, and the mixture was melt-kneaded with a single-screw extruder at 230° C. to obtain pellets.

The pellets were dried with a hot air dryer at 120° C. for 2 hours and then injection-molded to obtain test pieces for the above tests.

As a polypropylene (a) in Example 7 and Comparative Example 14, an injection-grade polypropylene was used. However, the polypropylene was different from those used in Examples 2 and 3 and Comparative Examples 6 and 7.

As a halogen-containing flame retardant (b) in Example 7 and Comparative Example 14, ethylenebispentabromodiphenyl was used.

As a flame-retardant aid (c) in Example 7 and Comparative Example 14, antimony trioxide (Atox B) supplied by Nihon Seiko K.K. was used.

As a silicone (d) in Example 7, silicon resin powder (DC4-7081) supplied by Toray-Dowcorning-Silicone K.K. was used.

As magnesium hydroxide particles (e) in Example 7, synthetic magnesium hydroxide particles having a BET specific surface area of 6.0 m$^2$/g and an average secondary particle diameter, measured by a microtrack method, of 0.9 μm were surface-treated with 0.5 part by weight, per 100 parts by weight of the magnesium hydroxide particles, of γ-aminopropyltrimethoxysilane, and the thus-surface-treated magnesium hydroxide particles were used.

As a polymer alloy compatibilizer in Example 7, a maleic-anhydride-modified styrene-ethylene-butene resin was used.

Table 12 shows test results of flame retardancy, mold releasability, Izod impact strength and mechanical strength.

The Izod impact strength was measured according to JIS K7110.

TABLE 11

| | Polypropylene (a) | Polymer alloy compatibilizer | Flame retardant (b) (Ethylenebispentabromodiphenyl) | Flame-retardant aid (c) (Antimony trioxide) | Silicone (d) | Magnesium hydroxide particles (e) |
| --- | --- | --- | --- | --- | --- | --- |
| Ex. 7 | 90 | 10 | 39 | 13 | 1 | 15 |
| Comp. Ex. 14 | 100 | 0 | 39 | 13 | 0 | 0 |

Ex.: Example, Comp. Ex.: Comparative Example

TABLE 12

| | Flame Retardancy Test | | |
| --- | --- | --- | --- |
| | | Flame Retardant Test, in accordance with Kyowa Chemical Method | |
| | UL94VE 1/16 inch | Test in dripping distance of 30 cm, 1/16 inch | Test in dripping distance of 5 cm, 1/16 inch |
| Ex. 7 | V-0 | K-0 | K-0 |
| Comp. Ex. 14 | V-1* | K-2 | K-2 |

| | Mold releasability | Izod impact strength (kgf · cm/cm) | Tensile yield strength (kgf/mm$^2$) |
| --- | --- | --- | --- |
| Ex. 7 | Good | 8.5 | 2.93 |
| Comp. Ex. 14 | Poor | 5.4 | 2.39 |

Ex.: Example, Comp. Ex.: Comparative Example

In the above Examples 1 to 7, there were obtained test results of V-0, V-1, K-0 and K-1, which are highly reliable and free of dripping, in both the UL94VE flame retardancy test and Kyowa Chemical flame retardancy test.

Further, the flame-retardant thermoplastic resin compositions obtained in Examples 1 to 7 were excellent in mold releasability and had no problem in mechanical strengths such as flexural strength, flexural modulus and tensile yield strength.

In contrast, the compositions obtained in Comparative Examples 1 to 14 were defective in one or more of the above tests.

In addition, in Examples 1 to 7 and Comparative Examples 1 to 14, 0.5 part by weight of tin maleate (TVS#8813, supplied by Nitto Kasei), 0.5 part by weight of hydrotalcite (DHT-4A, supplied by Kyowa Chemical), 0.5 part by weight of zinc stearate (supplied by Seido Kagaku), 0.5 part by weight of Irganox 1010 (supplied by Ciba Geigy) and 0.5 part by weight of Sanol LS770 (supplied by Ciba Geigy) were added per 100 parts by weight of the thermoplastic resin (a).

According to the present invention, there is provided a flame-retardant thermoplastic resin composition which undergoes extinction without dripping so that highly reliable flame retardancy can be obtained, which shows excellent mold releasability, which has improved elastic modulus as compared with a base resin, which gives a molded article that hardly suffers a decrease in tensile strength and flexural strength and which is economical.

What is claimed is:

1. A flame-retardant thermoplastic resin composition consisting essentially of (a) 100 parts by weight of a thermoplastic resin, (b) 5 to 60 parts by weight of a halogen-containing flame retardant, (c) 3 to 20 parts by weight of a flame-retardant aid, (d) 0.5 to 10 parts by weight of silicone and (e) 5 to 30 parts by weight of magnesium hydroxide particles, wherein said magnesium hydroxide particles (e) have a specific surface area, measured by a BET method, of 1 to 20 $m^2/g$ and an average secondary particle diameter, measured by a microtrack method, of 0.2 to 6.0 $\mu$m.

2. The composition of claim 1, wherein the magnesium hydroxide particles (e) are surface-treated with at least one surface-treating agent selected from the group consisting of higher fatty acids, a titanate coupling agent, a silane coupling agent, an aluminate coupling agent, phosphate esters of polyhydric alcohols and fatty acids, and an anionic surfactant.

3. The composition of claim 1, wherein the thermoplastic resin (a) is a polystyrene resin, a polyolefin resin or a polyamide resin.

4. The composition of claim 1, wherein the halogen-containing flame retardant (b) has a decomposition initiation temperature of 230° C. or above.

5. The composition of claim 1, wherein the halogen-containing flame retardant (b) is a bromine-containing flame retardant having a bromine content of at least 50% by weight.

6. The composition of claim 1, wherein the flame-retardant aid (c) is antimony trioxide, antimony pentoxide, zinc stannate or zinc borate.

7. The composition of claim 1, wherein the silicone (d) is a silicone resin or a silicone grease.

8. The composition of claim 1, wherein the halogen-containing flame retardant (b) is contained in an amount of 10 to 50 parts by weight per 100 parts by weight of the thermoplastic resin (a).

9. The composition of claim 1, wherein the flame-retardant aid (c) is contained in an amount of 5 to 18 parts by weight per 100 parts by weight of the thermoplastic resin (a).

10. The composition of claim 1, wherein the silicone (d) is contained in an amount of 1 to 5 parts by weight per 100 parts by weight of the thermoplastic resin (a).

11. The composition of claim 1, wherein the magnesium hydroxide particles (e) are contained in an amount of 8 to 20 parts by weight per 100 parts by weight of the thermoplastic resin (a).

12. A molded article formed of the flame-retardant thermoplastic resin composition of claim 1.

13. The molded article of claim 12, which gives an evaluation of V-0 in a test according to the UL94VE method.

14. The molded article of claim 12, which gives an evaluation of K-0 in a test according to the Kyowa Chemical method, which is a modified UL94VE method.

15. A flame-retardant thermoplastic resin composition consisting essentially of (a) 100 parts by weight of a thermoplastic resin, (b) 10 to 50 parts by weight of a halogen-containing flame retardant, (c) 5 to 18 parts by weight of a flame-retardant aid, (d) 1 to 5 parts by weight of silicone and (e) 8 to 20 parts by weight of magnesium hydroxide particles, wherein the silicone (d) is selected from the group consisting of silicone resin and silicone grease, and wherein the magnesium hydroxide particles (e) have a specific surface area, measured by a BET method, of 1 to 20 $m^2/g$ and an average secondary particle diameter, measured by a microtrack method, of 0.2 to 6.0 $\mu$m.

16. The composition of claim 15, wherein the thermoplastic resin (a) is a polystyrene resin, a polyolefin resin or a polyamide resin.

17. The composition of claim 15, wherein the halogen-containing flame retardant (b) is a bromine-containing flame retardant having a bromine content of at least 50% by weight.

* * * * *